(12) United States Patent
Edamura et al.

(10) Patent No.: US 8,700,275 B2
(45) Date of Patent: Apr. 15, 2014

(54) HYBRID CONSTRUCTION MACHINE AND AUXILIARY CONTROL DEVICE USED THEREIN

(75) Inventors: Manabu Edamura, Kasumigaura (JP); Kouji Ishikawa, Kasumigaura (JP); Manabu Sugiura, Tsuchiura (JP); Takenori Hiroki, Ibaraki-ken (JP); Toshihiko Watanabe, Ushiku (JP); Hidetoshi Satake, Ishioka (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/981,659

(22) PCT Filed: Mar. 13, 2012

(86) PCT No.: PCT/JP2012/056484
§ 371 (c)(1), (2), (4) Date: Jul. 25, 2013

(87) PCT Pub. No.: WO2012/128132
PCT Pub. Date: Sep. 27, 2012

(65) Prior Publication Data
US 2013/0311052 A1    Nov. 21, 2013

(30) Foreign Application Priority Data

Mar. 22, 2011  (JP) .................................. 2011-063078

(51) Int. Cl.
*G06F 11/00* (2006.01)
(52) U.S. Cl.
USPC .............. 701/50; 701/36; 701/29.1; 701/29.2

(58) Field of Classification Search
None
See application file for complete search history.

(56) References Cited

U.S. PATENT DOCUMENTS 6,666,022 B1 * 12/2003 Yoshimatsu et al. ............ 60/413
6,820,356 B2 * 11/2004 Naruse et al. .................. 37/348
7,745,947 B2 *  6/2010 Komiyama et al. ......... 290/40 C (Continued)

FOREIGN PATENT DOCUMENTS

JP    2001-016704 A    1/2001
JP    2004-124381 A    4/2004

(Continued)

OTHER PUBLICATIONS

International Preliminary Report on Patentability received in International Application No. PCT/JP2012/056484 dated Oct. 3, 2013.

*Primary Examiner* — Jonathan M Dager
(74) *Attorney, Agent, or Firm* — Mattingly & Malur, PC

(57) ABSTRACT

Disclosed is a hybrid construction machine that includes a control device and an auxiliary control device. The control device switches between a hydraulic/electric complex swing mode in which both the electric motor and the hydraulic motor are driven to drive the swing structure by using the sum of the torque of the electric motor and the torque of the hydraulic motor; and a hydraulic-only swing mode in which only the hydraulic motor is driven to drive the swing structure by using only the torque of the hydraulic motor. The auxiliary control device includes a monitoring controller that is connected to the control device and to the electric motor to monitor the temperature or electrical leakage in the electric motor as a substitute controller for the power control unit or the electrical storage device when the power control unit or the electrical storage device is removed due to a fault.

6 Claims, 13 Drawing Sheets

(56) References Cited

U.S. PATENT DOCUMENTS

| | | | |
|---|---|---|---|
| 8,362,629 B2* | 1/2013 | Weber et al. | 290/4 D |
| 8,407,993 B2* | 4/2013 | Vigholm et al. | 60/327 |
| 8,532,855 B2* | 9/2013 | Koga et al. | 701/22 |
| 2002/0125052 A1* | 9/2002 | Naruse et al. | 180/53.8 |
| 2003/0132729 A1* | 7/2003 | Yoshimatsu | 320/104 |
| 2004/0148817 A1* | 8/2004 | Kagoshima et al. | 37/348 |
| 2004/0222000 A1* | 11/2004 | Ohtsukasa | 172/2 |
| 2005/0001606 A1* | 1/2005 | Kagoshima | 323/371 |
| 2005/0036894 A1* | 2/2005 | Oguri | 417/212 |
| 2007/0096667 A1* | 5/2007 | Komiyama et al. | 318/98 |
| 2007/0214782 A1* | 9/2007 | Komiyama et al. | 60/431 |
| 2009/0036264 A1* | 2/2009 | Tozawa et al. | 477/5 |
| 2009/0044528 A1* | 2/2009 | Narazaki et al. | 60/452 |
| 2010/0031650 A1* | 2/2010 | Morinaga et al. | 60/459 |
| 2010/0071973 A1* | 3/2010 | Morinaga et al. | 180/65.265 |
| 2010/0097037 A1* | 4/2010 | Morinaga et al. | 322/14 |
| 2010/0102763 A1 | 4/2010 | Kagoshima et al. | |
| 2010/0115800 A1* | 5/2010 | Sakai et al. | 37/348 |
| 2010/0162706 A1 | 7/2010 | Sakai et al. | |
| 2012/0240582 A1* | 9/2012 | Ooki et al. | 60/711 |
| 2012/0296574 A1* | 11/2012 | Ooki et al. | 702/35 |
| 2013/0058750 A1* | 3/2013 | Hiroki et al. | 414/744.2 |
| 2013/0174556 A1* | 7/2013 | Nishikawa et al. | 60/718 |
| 2013/0243557 A1* | 9/2013 | Hiroki et al. | 414/687 |
| 2013/0275011 A1* | 10/2013 | Ota et al. | 701/50 |

FOREIGN PATENT DOCUMENTS

| | | |
|---|---|---|
| JP | 2008-063888 A | 3/2008 |
| JP | 2008-297754 A | 12/2008 |
| JP | 2010-106513 A | 5/2010 |

* cited by examiner

HYBRID CONSTRUCTION MACHINE AND AUXILIARY CONTROL DEVICE USED THEREIN

TECHNICAL FIELD

The present invention relates to a hybrid construction machine and an auxiliary control device used therein. More specifically, the present invention relates to a hybrid construction machine having a swing structure, such as a hybrid hydraulic excavator, and to an auxiliary control device used therein.

BACKGROUND ART

A construction machine such as a hydraulic excavator uses gasoline, light oil, or other fuel as a motive power source and drives a hydraulic pump with an engine to generate hydraulic pressure, thereby driving hydraulic actuators such as hydraulic motors or hydraulic cylinders. As the hydraulic actuator is compact, lightweight, and capable of generating high output, it is widely used as a construction machine actuator.

Meanwhile, a construction machine recently proposed, for instance, in Patent Document 1 uses an electric motor and electrical storage devices (e.g., a battery and an electric double layer capacitor) to provide increased energy savings by achieving higher energy efficiency than a conventional construction machine that uses only hydraulic actuators.

The electric motor (electric actuator) excels in terms of energy conservation as it achieves higher energy efficiency than the hydraulic actuator and can generate electrical energy from kinetic energy during braking (the kinetic energy used during braking is released in the form of heat when the hydraulic actuator is used).

For example, Patent Document 1, which relates to a conventional technology, describes an embodiment of a hydraulic excavator that incorporates an electric motor as a swing structure drive actuator. An actuator that turnably drives an upper swing structure of the hydraulic excavator with respect to a lower track structure (a hydraulic motor is conventionally used) is frequently used as it starts, stops, accelerates, and decelerates repeatedly at frequent intervals.

In this instance, the kinetic energy of the swing structure that is used during deceleration (braking) is discarded in the form of heat within a hydraulic circuit when the hydraulic actuator is used. However, when the electric motor is used, energy saving can be achieved because the kinetic energy can be regenerated as electrical energy.

In the meantime, a construction machine proposed, for instance, in Patent Documents 2 and 3 incorporates both a hydraulic motor and an electric motor and drives a swing structure by using the total torque generated by the two motors.

An energy regeneration device disclosed in Patent Document 2 is for use in a hydraulic construction machine in which an electric motor is directly coupled to a swing structure drive hydraulic motor and a controller issues an output torque command to the electric motor in accordance with the amount of control lever operation. During deceleration (braking), the electric motor generates electrical energy from the kinetic energy of the swing structure and stores the generated electrical energy in a battery.

A hybrid construction machine disclosed in Patent Document 3 calculates a torque command value for an electric motor in accordance with a differential pressure between the inlet and outlet of a swing drive hydraulic motor and allots an appropriate output torque to each of the hydraulic motor and the electric motor.

Conventional technologies described in Patent Documents 2 and 3 both use an electric motor and a hydraulic motor simultaneously as swing drive actuators so that an operator familiar with a conventional, hydraulic-actuator-driven construction machine feels comfortable when performing operations, and that increased energy savings will be realized by using a simple, easy-to-implement configuration.

PRIOR ART LITERATURE

Patent Documents

Patent Document 1: JP,A 2001-016704
Patent Document 2: JP,A 2004-124381
Patent Document 3: JP,A 2008-63888

SUMMARY OF THE INVENTION

Problem to be Solved by the Invention

A hybrid hydraulic excavator described in Patent Document 1 is advantageous in terms of energy conservation because the kinetic energy of a swing structure is regenerated as electrical energy by an electric motor during deceleration (braking).

However, if a failure occurs in an electrical system, the power supply to the electric motor is shut off so that no turning motion can be performed. Hydraulic excavators are used for a long period of time in a harsh environment. Therefore, the hydraulic excavators can no longer be used if they are irreparable in the event of a critical electrical system failure.

Hybrid hydraulic excavators described in Patent Documents 2 and 3 are configured so that both a hydraulic motor and an electric motor are incorporated in a swing device. Therefore, even if an electrical system failure occurs, motions can be performed to a certain extent by the hydraulic motor alone.

However, a certain portion of the total torque required for swing drive is provided by the electric motor. Therefore, if the electric motor cannot generate its torque due, for instance, to a failure or abnormality in an inverter, motor, or other electrical system component, energy insufficiency of an electrical storage device, or an overcharged electrical storage device, the total torque for driving the swing structure is insufficient. As a result, the hybrid hydraulic excavators may fail to start and stop unlike in a normal state.

Further, if a permanent-magnet synchronous motor, which is generally used as a high-output motor, is used in such a manner that its rotor is forcibly rotated while it does not generate torque, an induced voltage is generated in an electric motor terminal section due to power generation. If the electric motor, inverter, electrical storage device, or other component of an electric operating system becomes faulty while the construction machine is operated in the above-described state, the above-mentioned induced voltage may be short-circuited by a faulty part so that an accidental short-circuit current flows. This may break an element such as an IGBT (insulated gate bipolar transistor) in the inverter or overheat a part of the electric operating system, thereby degrading performance.

The above-mentioned patent documents do not expressly describe any detailed operating method or procedure when the electrical system is faulty.

The present invention has been made in view of the above circumstances. An object of the present invention is to provide a hybrid construction machine that uses a hydraulic motor and an electric motor to drive a swing structure, that provides uninterrupted operations even when the electric motor cannot generate its torque due, for instance, to a failure in the electric motor, an inverter, an electrical storage device, or other component of an electric operating system, and that remains safely usable particularly when the electric operating system is irreparable due, for instance, to deterioration. Another object of the present invention is to provide an auxiliary control device that is used in the hybrid construction machine.

Means for Solving the Problem

In accomplishing the above object, according to a first aspect of the present invention, there is provided a hybrid construction machine having a prime mover, a hydraulic pump driven by the prime mover, a swing structure, an electric motor for driving the swing structure, a power control unit for driving the electric motor, a hydraulic motor driven by the hydraulic pump to drive the swing structure, an electrical storage device connected to the electric motor, and a swing control lever device for issuing a command for driving the swing structure. The hybrid construction machine includes a control device and an auxiliary control device. The control device switches between a hydraulic/electric complex swing mode and a hydraulic-only swing mode. In the hydraulic/electric complex swing mode, when the swing control lever device is manipulated, both the electric motor and the hydraulic motor are driven to drive the swing structure by using the sum of the torque of the electric motor and the torque of the hydraulic motor. In the hydraulic-only swing mode, when the swing control lever device is manipulated, only the hydraulic motor is driven to drive the swing structure by using only the torque of the hydraulic motor. The auxiliary control device includes a monitoring controller that is connected to the control device and to the electric motor to monitor the temperature or electrical leakage in the electric motor as a substitute controller for the power control unit or the electrical storage device when the power control unit or the electrical storage device is removed due to its fault.

According to a second aspect of the present invention, there is provided the hybrid construction machine as described in the first aspect, wherein the auxiliary control device includes a monitoring controller having a temperature sensor for detecting the internal temperature of the electric motor, a memory section for memorizing a preselected limit value, and a computation section for reporting an abnormality to the control device when the preselected limit value is exceeded by a value detected by the temperature sensor.

According to a third aspect of the present invention, there is provided the hybrid construction machine as described in the first aspect, wherein the auxiliary control device includes a monitoring controller having a current sensor for detecting the output current of the electric motor, a memory section for memorizing a preselected limit value, and a computation section for reporting an abnormality to the control device when the preselected limit value is exceeded by a value detected by the current sensor.

According to a fourth aspect of the present invention, there is provided an auxiliary control device for a hybrid construction machine having a prime mover, a hydraulic pump driven by the prime mover, a swing structure, an electric motor for driving the swing structure, a power control unit for driving the electric motor, a hydraulic motor driven by the hydraulic pump to drive the swing structure, an electrical storage device connected to the electric motor, a swing control lever device for issuing a command for driving the swing structure, and a control device for switching between a hydraulic/electric complex swing mode and a hydraulic-only swing mode. In the hydraulic/electric complex swing mode, when the swing control lever device is manipulated, both the electric motor and the hydraulic motor are driven to drive the swing structure by using the sum of the torque of the electric motor and the torque of the hydraulic motor. In the hydraulic-only swing mode, when the swing control lever device is manipulated, only the hydraulic motor is driven to drive the swing structure by using only the torque of the hydraulic motor. The auxiliary control device includes a monitoring controller that is connected to the control device to monitor the temperature or electrical leakage in the electric motor as a substitute for the power control unit or the electrical storage device when the power control unit or the electrical storage device is removed due to its fault.

According to a fifth aspect of the present invention, there is provided the auxiliary control device as described in the fourth aspect, wherein the monitoring controller includes a temperature sensor for detecting the internal temperature of the electric motor, a memory section for memorizing a preselected limit value, and a computation section for reporting an abnormality to the control device when the preselected limit value is exceeded by a value detected by the temperature sensor.

According to a sixth aspect of the present invention, there is provided the auxiliary control device as described in the fourth aspect, wherein the monitoring controller includes a current sensor for detecting the output current of the electric motor, a memory section for memorizing a preselected limit value, and a computation section for reporting an abnormality to the control device when the preselected limit value is exceeded by a value detected by the current sensor.

Effects of the Invention

The hybrid construction machine according to the present invention, which uses a hydraulic motor and an electric motor to drive a swing structure, can perform operations by driving the swing structure with the hydraulic motor alone even when the electric motor cannot generate its torque due, for instance, to a failure in the electric motor, an inverter, an electrical storage device, or other component of an electric operating system. Further, even when the electric operating system is irreparable due, for instance, to deterioration, uninterrupted operations can be performed by incorporating an auxiliary control device into the electric operating system as a substitute, monitoring the temperature or electrical leakage in the electric motor, and driving the swing structure with the hydraulic motor alone.

MODE FOR CARRYING OUT THE INVENTION

Figure 1:
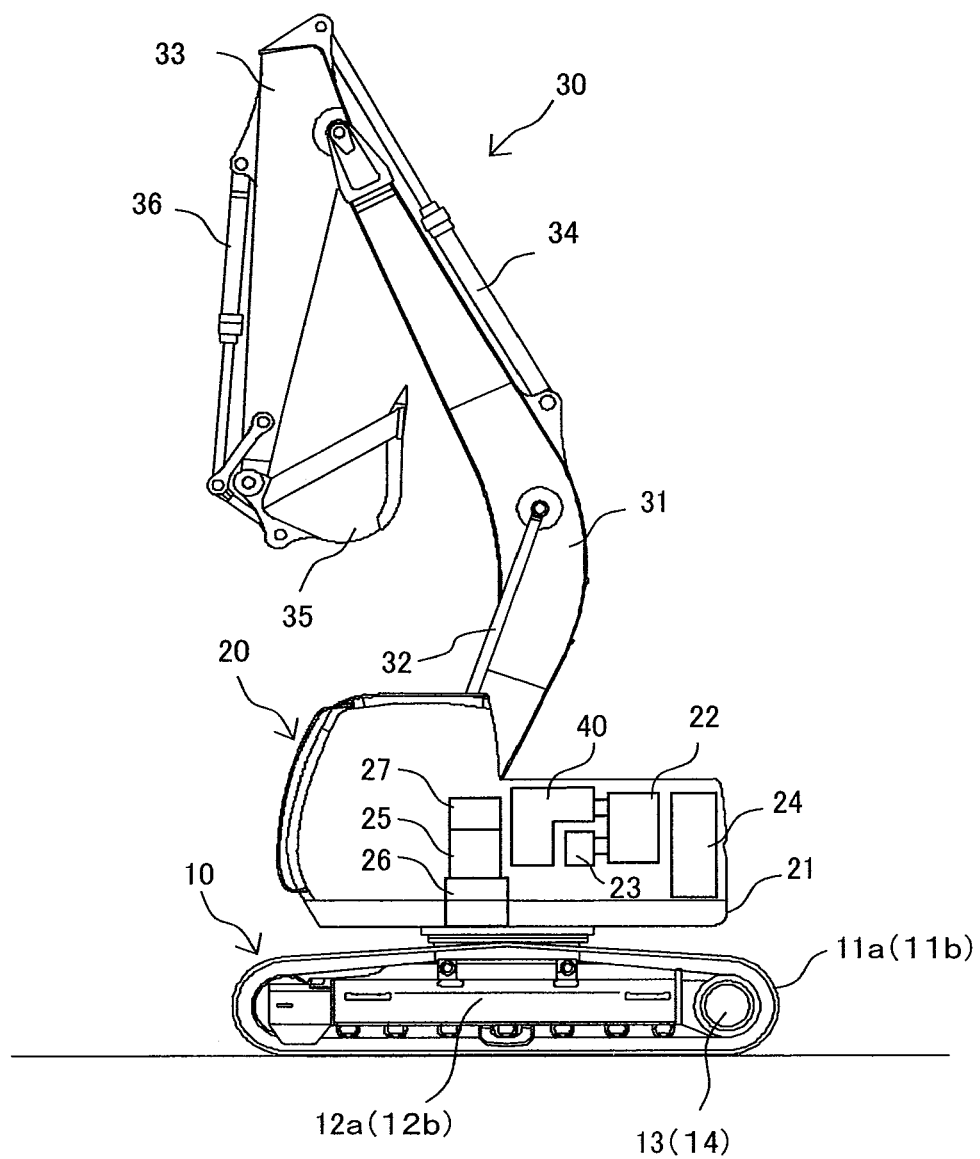
FIG. 1 is a side view illustrating an embodiment of the present invention of a hybrid construction machine and an auxiliary control device used therein.
Figure 2:
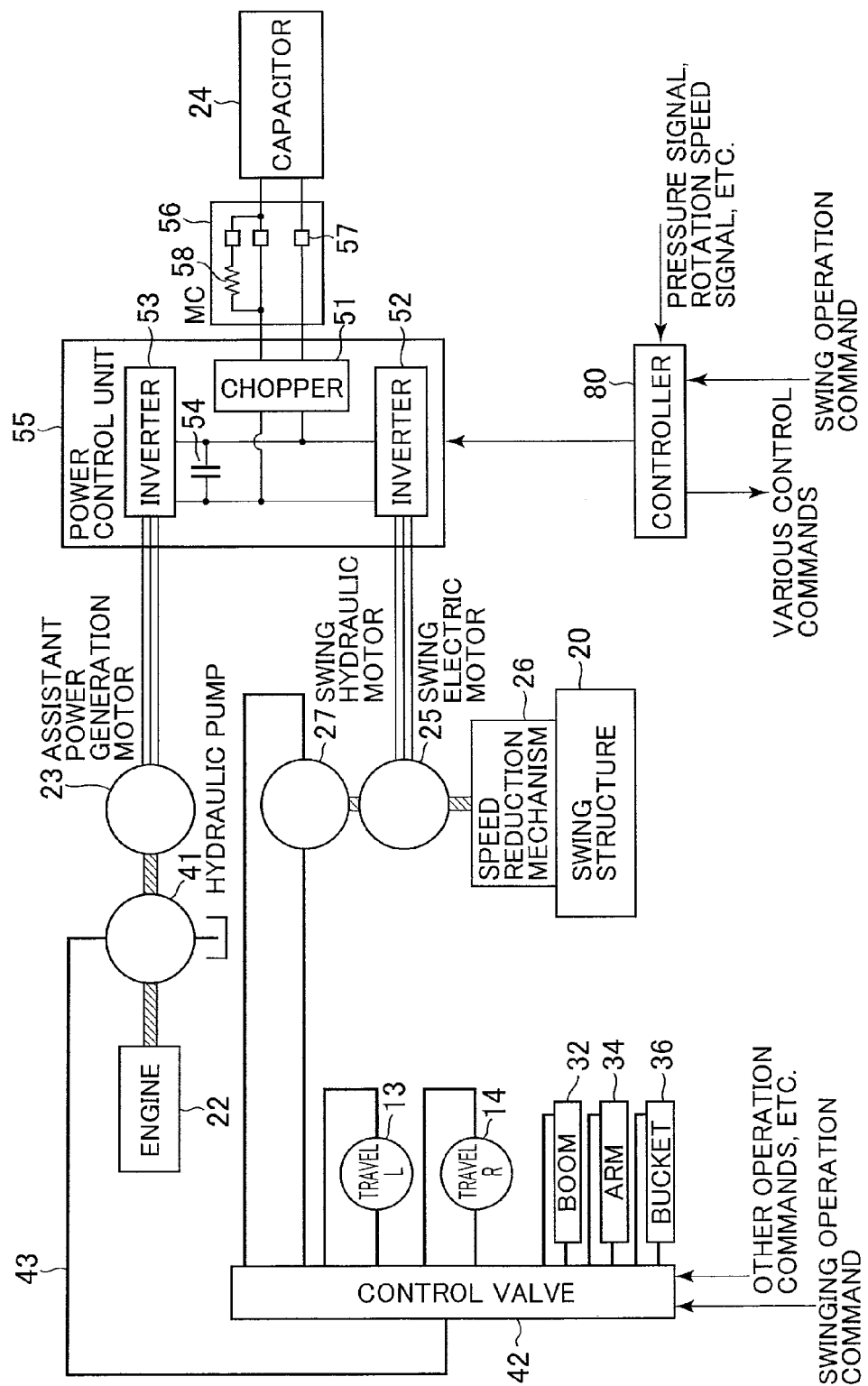
FIG. 2 is a system configuration diagram illustrating electric equipment and hydraulic equipment included in an embodiment of the present invention of the hybrid construction machine and the auxiliary control device used therein.
Figure 3:
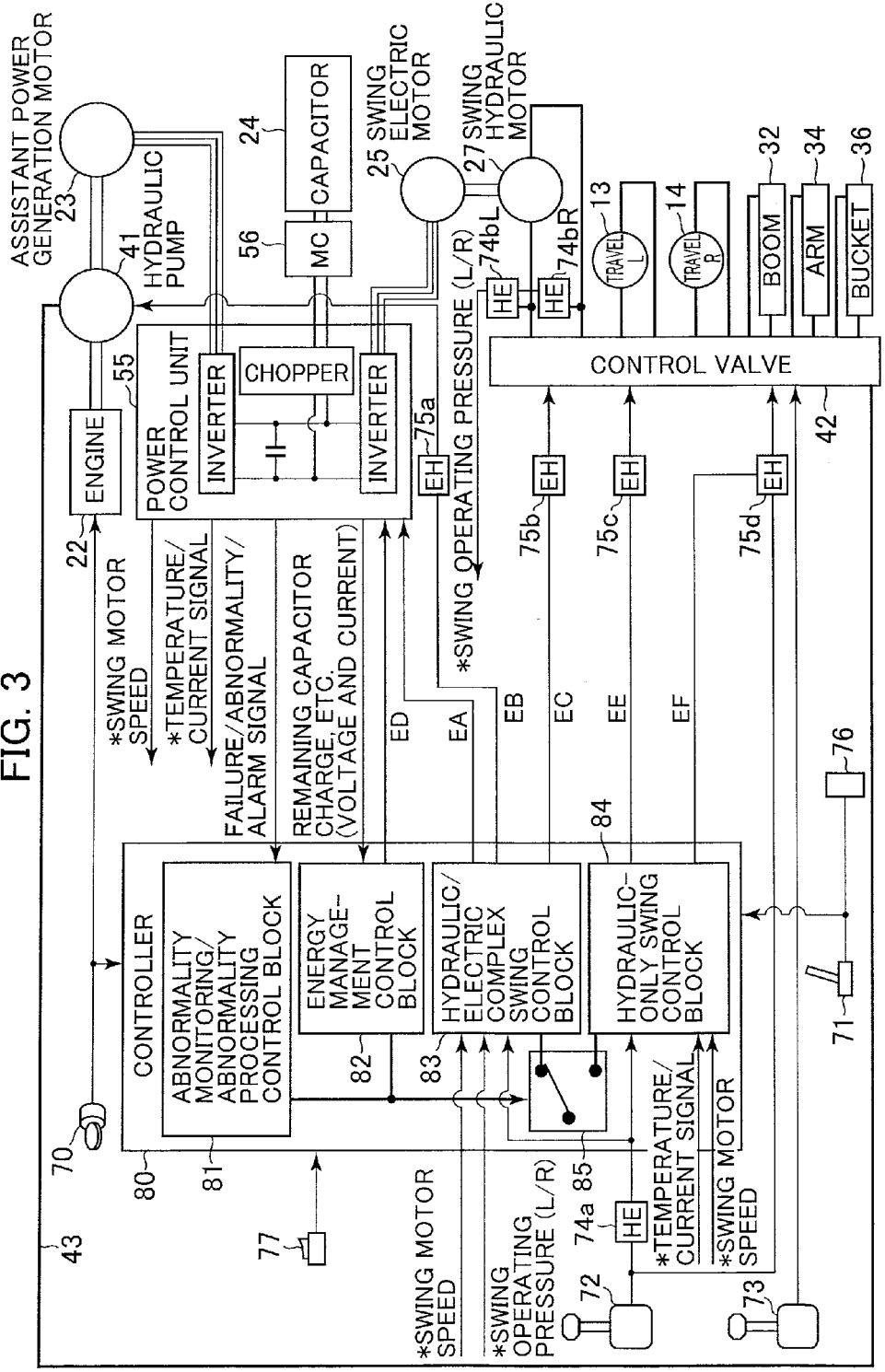
FIG. 3 is a system configuration/control block diagram illustrating an embodiment of the present invention of the hybrid construction machine and the auxiliary control device used therein.

Embodiments of a construction machine according to the present invention will now be described with reference to the accompanying drawings. More specifically, taking a hydraulic excavator as an example of the construction machine, the embodiments of the present invention will be described. The present invention, however, is applicable to all construction machines (including work machines) having a swing structure. The applicability of the present invention is not limited to hydraulic excavators. For example, the present invention is also applicable to various other construction machines such as a crane truck having a swing structure. FIG. 1 is a side view illustrating an embodiment of the present invention of a hybrid construction machine and an auxiliary control device used therein. FIG. 2 is a system configuration diagram illustrating electric equipment and hydraulic equipment included in an embodiment of the present invention of the hybrid construction machine and the auxiliary control device used therein. FIG. 3 is a system configuration/control block diagram illustrating an embodiment of the present invention of the hybrid construction machine and the auxiliary control device used therein.

Referring to FIG. 1, a hybrid hydraulic excavator includes a track structure 10, a swing structure 20 turnably mounted on the track structure 10, and an excavator mechanism 30.

The track structure 10 includes, for example, a pair of crawlers 11a, 11b, a pair of crawler frames 12a, 12b (only one of the crawler frames is shown in FIG. 1), a pair of travel hydraulic motors 13, 14 for providing independent drive control of the crawlers 11a, 11b, and a speed reduction mechanism for the travel hydraulic motors 13, 14.

The swing structure 20 includes, for example, a swing frame 21, an engine 22, an assist power generation motor 23, a swing electric motor 25, a swing hydraulic motor 27, an electric double layer capacitor 24, and a speed reduction mechanism 26. The engine 22 acts as a prime mover. The assist power generation motor 23 is driven by the engine 22. The electric double layer capacitor 24 is connected to the assist power generation motor 23 and to the swing electric motor 25. The speed reduction mechanism 26 reduces the rotation speed of the swing electric motor 25 and of the swing hydraulic motor 27. A driving force generated by the swing electric motor 25 and by the swing hydraulic motor 27 is transmitted through the speed reduction mechanism 26 to turnably drive the swing structure 20 (swing frame 21) with respect to the track structure 10.

Further, the excavator mechanism (front device) 30 is mounted on the swing structure 20. The excavator mechanism 30 includes, for example, a boom 31, a boom cylinder 32 for driving the boom 31, an arm 33 rotatably supported in the vicinity of the leading end of the boom 31, an arm cylinder 34 for driving the arm 33, a bucket 35 rotatably supported by the leading end of the arm 33, and a bucket cylinder 36 for driving the bucket 35.

Furthermore, mounted on the swing frame 21 of the swing structure 20, the travel hydraulic motors 13, 14, the swing hydraulic motor 27, the boom cylinder 32, the arm cylinder 34, and a hydraulic system 40 for driving the bucket cylinder 36 and other hydraulic actuators are provided. The hydraulic system 40 includes a hydraulic pump 41 (FIG. 2) for generating a hydraulic pressure and a control valve 42 (FIG. 2) for providing drive control of various actuators. The hydraulic pump 41 is driven by the engine 22.

The system configuration of electric equipment and hydraulic equipment in the hydraulic excavator will now be outlined. As shown in FIG. 2, the driving force of the engine 22 is transmitted to the hydraulic pump 41. In accordance with a swing operation command (hydraulic pilot signal) from a swing control lever device 72 (see FIG. 3), the control valve 42 controls the flow rate and direction of a hydraulic fluid supplied to the swing hydraulic motor 27. Further, in accordance with an operation command (hydraulic pilot signal) from a control lever device 73 irrelevant to turning (see FIG. 3), the control valve 42 controls the flow rate and direction of a hydraulic fluid supplied to the boom cylinder 32, the arm cylinder 34, the bucket cylinder 36, and the travel hydraulic motors 13, 14.

The electric operating system includes, for example, a power control unit 55 and a main contactor 56 in addition to the aforementioned assist power generation motor 23, capacitor 24, and swing electric motor 25. The power control unit 55 includes, for example, a chopper 51, inverters 52, 53, and a smoothing capacitor 54. The main contactor 56 includes, for example, a main relay 57 and an inrush current prevention circuit 58.

DC power from the capacitor 24 is boosted to a predetermined busbar voltage by the chopper 51 and input to the inverter 52 for driving the swing electric motor 25 and to the inverter 53 for driving the assist power generation motor 23. The smoothing capacitor 54 is used to stabilize the busbar voltage. The rotating shaft of the swing electric motor 25 is coupled to that of the swing hydraulic motor 27 in order to drive the swing structure 20 through the speed reduction mechanism 26. The capacitor 24 is charged or discharged depending on the drive status of the assist power generation motor 23 and of the swing electric motor 25 (depending on whether power running or regeneration is in progress).

A controller 80 uses a swing operation command signal, a pressure signal, a rotation speed signal, and other signals (described later) to generate control commands for the control valve 42 and the power control unit 55 for the purpose, for instance, of switching between a hydraulic-only swing mode for using the swing hydraulic motor 27 and a hydraulic/electric complex swing mode for using the swing hydraulic motor 27 and the swing electric motor 25, exercising turning control in each mode, monitoring for electric operating system abnormalities, and performing energy management.

Devices, control means, control signals, and other things required for turning control according to the present invention will now be described in further detail using the FIG. 3.

The hydraulic excavator includes an ignition key 70 and a gate lock lever device 71. The ignition key 70 is used to start the engine 22. The gate lock lever device 71 turns on a pilot pressure shut-off valve 76 to disable the hydraulic system when an operation is to be halted. The hydraulic excavator also includes the controller 80, hydraulic-electric conversion devices 74a, 74bL, 74bR, electric-hydraulic conversion devices 75a, 75b, 75c, 75d, and a hydraulic-only swing mode selection switch 77. These included components constitute a turning control system. The hydraulic-electric conversion devices 74a, 74bL, 74bR and the electric-hydraulic conversion devices 75a, 75b, 75c, 75d are involved in the input/output of the controller 80. The hydraulic-electric conversion devices 74a, 74bL, 74bR are pressure sensors. The electric-hydraulic conversion devices 75a, 75b, 75c, 75d are, for example, solenoid proportional pressure reducing valves.

The controller 80 includes, for example, an abnormality monitoring/abnormality processing control block 81, an energy management control block 82, a hydraulic/electric complex swing control block 83, a hydraulic-only swing control block 84, and a control changeover block 85.

When the entire system is normal and the swing electric motor 25 is drivable, the controller 80 selects the hydraulic/electric complex swing mode. In this instance, the control changeover block 85 selects the hydraulic/electric complex swing control block 83 so that the hydraulic/electric complex swing control block 83 controls a turning actuator motion. The hydraulic pilot signal generated by an input to the swing control lever device 72 is converted to an electrical signal by the hydraulic-electric conversion device 74a and input to the hydraulic/electric complex swing control block 83. The operating pressure of the swing hydraulic motor 27 is converted to an electrical signal by the hydraulic-electric conversion device 74bL, 74bR and input to the hydraulic/electric complex swing control block 83. A swing motor speed signal output from an electric motor driving inverter in the power control unit 55 is also input to the hydraulic/electric complex swing control block 83. The hydraulic/electric complex swing control block 83 performs predetermined computations to calculate a command torque for the swing electric motor 25 in accordance with the hydraulic pilot signal from the swing control lever device 72, the operating pressure signal of the swing hydraulic motor 27, and the swing motor speed signal, and outputs a torque command EA to the power control unit 55. As a result, the swing electric motor 25 is driven. At the same time, torque reduction commands EB, EC for reducing the output torque of the hydraulic pump 41 and the output torque of the swing hydraulic motor 27 by the torque output from the swing electric motor 25 are output to the electric-hydraulic conversion devices 75a, 75b.

Meanwhile, the hydraulic pilot signal generated by an input to the swing control lever device 72 is also input to the control valve 42. This moves a swing spool 61 (see FIG. 4) from its neutral position to the "A" or "C" position and supplies the hydraulic fluid discharged from the hydraulic pump 41 to the swing hydraulic motor 27. As a result, the swing hydraulic motor 27 is simultaneously driven.

The amount of electricity stored in the capacitor 24 increases or decreases in accordance with the difference between the amount of energy consumed when the swing electric motor 25 accelerates and the amount of energy regenerated when the swing electric motor 25 decelerates. This is controlled by the energy management control block 82. The energy management control block 82 inputs detection signals indicative of the voltage, current, and temperature of the capacitor 24 and outputs a power generation or assist command ED to the assist power generation motor 23 for the purpose of exercising control to maintain the amount of electricity stored in the capacitor 24 within a predetermined range.

If a failure, an abnormality, or an alarm condition occurs in the power control unit 55, swing electric motor 25, capacitor 24, or other electric operating system component or if the amount of electricity stored in the capacitor 24 is outside the predetermined range, the abnormality monitoring/abnormality processing control block 81 and the energy management control block 82 operate the control changeover block 85 to select the hydraulic-only swing control block 84, thereby switching from the hydraulic/electric complex swing mode to the hydraulic-only swing mode. Basically, a swing hydraulic system is adapted to coordinate with the swing electric motor 25. Therefore, the hydraulic-only swing control block 84 outputs a swing drive characteristics correction command EE and a swing pilot pressure correction command EF to the electric-hydraulic conversion devices 75c, 75d in order to make corrections by increasing the drive torque of the swing hydraulic motor 27 and by increasing the braking torque of the swing hydraulic motor 27. In this manner, the hydraulic-only swing control block 84 exercises control so that turning operability remains intact even when the torque of the swing electric motor 25 is unavailable.

The hydraulic-only swing mode selection switch 77 is used when the hydraulic-only swing mode is to remain selected due, for instance, to a failure in the electric operating system or in the installation of a particular attachment. When the hydraulic-only swing mode selection switch 77 is placed in the ON position, the hydraulic-only swing control block 84 remains selected by the control changeover block 85.

Figure 4:
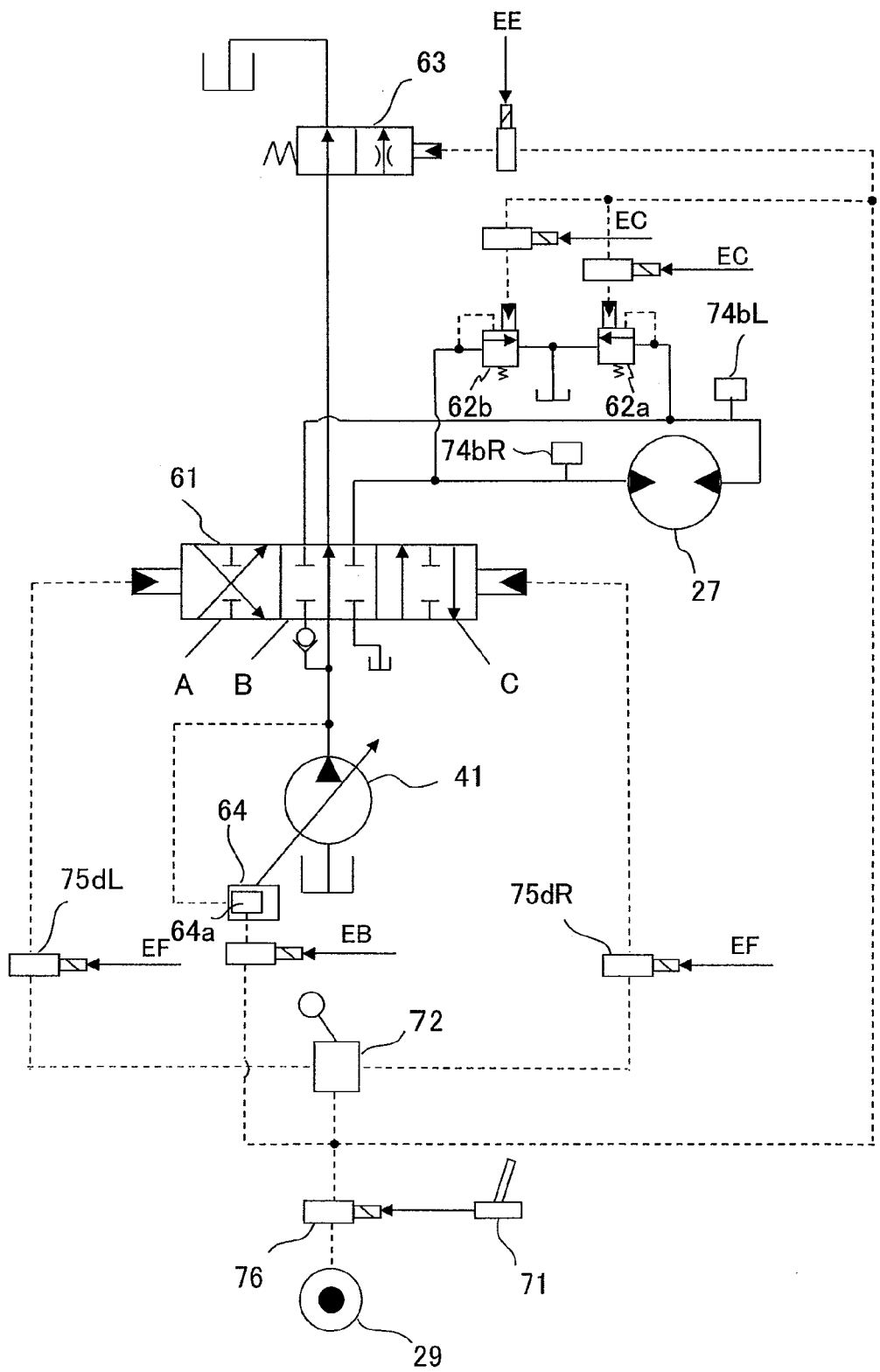
FIG. 4 is a hydraulic circuit diagram illustrating the configuration of a swing hydraulic system included in an embodiment of the present invention of the hybrid construction machine and the auxiliary control device used therein.

The swing hydraulic system will now be described in detail with reference to FIGS. 4 to 12. FIG. 4 is a hydraulic circuit diagram illustrating the configuration of the swing hydraulic system included in an embodiment of the present invention of the hybrid construction machine and the auxiliary control device used therein. Elements shown in FIG. 4 and designated by the same reference numerals as those in FIGS. 1 to 3 are identical with their counterpart elements in FIGS. 1 to 3 and will not be described in detail.

The control valve 42 shown in FIG. 3 includes a valve part, called a spool, for each actuator. In accordance with a command (hydraulic pilot signal) received from the control lever devices 72, 73, the associated spool becomes displaced to change an opening area, thereby changing the flow rate of the hydraulic fluid passing through each hydraulic line. The swing hydraulic system shown in FIG. 4 includes the swing spool only.

The swing hydraulic system can switch into a first mode and into a second mode. In the first mode, the maximum output torque of the swing hydraulic motor 27 is a first torque. In the second mode, the maximum output torque of the swing hydraulic motor 27 is a second torque, which is higher than the first torque. Details are given below.

Referring to FIG. 4, the swing hydraulic system includes the hydraulic pump 41, the swing hydraulic motor 27, the swing spool 61, swing variable overload relief valves 62a, 62b, and a center bypass cut valve 63, which acts as a swing auxiliary valve.

The hydraulic pump 41 is a variable displacement pump that includes a regulator 64 having a torque control section 64a. When the regulator 64 operates, the tilting angle of the hydraulic pump 41 changes to change the displacement of the hydraulic pump 41, thereby changing the delivery rate and output torque of the hydraulic pump 41. When the hydraulic/electric complex swing control block 83 shown in FIG. 3 outputs the torque reduction command EB to the electric-hydraulic conversion device 75a, the electric-hydraulic conversion device 75a outputs the corresponding control pressure to the torque control section 64a of the regulator 64. The torque control section 64a then changes its setting in such a manner as to decrease the maximum output torque of the hydraulic pump 41 by the amount of torque output from the swing electric motor 25.

Figure 5:
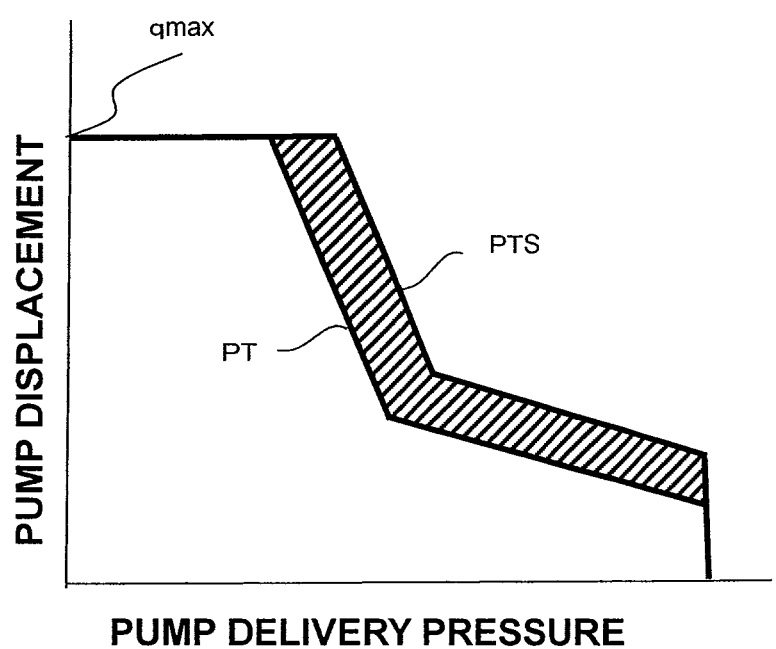
FIG. 5 is a characteristic diagram illustrating the torque control characteristics of a hydraulic pump included in an embodiment of the present invention of the hybrid construction machine and the auxiliary control device used therein.

FIG. 5 shows the torque control characteristics of the hydraulic pump 41. The horizontal axis indicates the delivery pressure of the hydraulic pump 41, whereas the vertical axis indicates the displacement of the hydraulic pump 41.

When the hydraulic/electric complex swing mode is selected and the torque reduction command EB is output to the electric-hydraulic conversion device 75a, the electric-hydraulic conversion device 75a is generating the control pressure. In this instance, the setting of the torque control section 64a represents the characteristics of a solid line PT whose maximum output torque is lower than that of a solid line PTS (first mode). When the hydraulic-only swing mode is selected and the torque reduction command EB is not output to the electric-hydraulic conversion device 75a, the torque control section 64a changes to the characteristics of the solid line PTS (second mode) so that the maximum output torque of the hydraulic pump 41 increases by an amount equivalent to the shaded area.

Returning to FIG. 4, the swing spool 61 has three positioned named A, B, and C. Upon receipt of the swing operation command (hydraulic pilot signal) from the control lever device 72, the swing spool 61, continuously switches from the "B" position (neutral position) to the "A" or "C" position.

The control lever device 72 has a built-in pressure reducing valve that reduces the pressure from a pilot hydraulic pressure source 29 in accordance with the amount of lever operation. The control lever device 72 applies a pressure (hydraulic pilot signal) corresponding to the lever operation amount to either a left or right pressure chamber of the swing spool 61.

When the swing spool 61 is in the "B" position (neutral position), the hydraulic fluid discharged from the hydraulic pump 41 passes through a bleed-off throttle and returns to a tank through the center bypass cut valve 63. When the swing spool 61 receives a pressure (hydraulic pilot signal) corresponding to the lever operation amount and switches to the "A" position, the hydraulic fluid from the hydraulic pump 41 is forwarded to the right side of the swing hydraulic motor 27 through a meter-in throttle in the "A" position. The hydraulic fluid returned from the swing hydraulic motor 27 returns to the tank through a meter-out throttle at the "A" position, thereby rotating the swing hydraulic motor 27 in one direction. When, on the contrary, the swing spool 61 receives a pressure (hydraulic pilot signal) corresponding to the lever operation amount and switches to the "C" position, the hydraulic fluid from the hydraulic pump 41 is forwarded to the left side of the swing hydraulic motor 27 through the meter-in throttle in the "C" position. The hydraulic fluid returned from the swing hydraulic motor 27 then returns to the tank through a meter-out throttle at the "C" position, thereby rotating the swing hydraulic motor 27 in a direction opposite to the direction in the case of the "A" position.

When the swing spool 61 is at a position intermediate between the "B" and "A" positions, the hydraulic fluid from the hydraulic pump 41 is distributed to the bleed-off throttle and to the meter-in throttle. In this instance, a pressure arises at the inlet of the meter-in throttle in accordance with the opening area of the bleed-off throttle and with the opening area of the center bypass cut valve 63. The pressure supplies the hydraulic fluid to the swing hydraulic motor 27 so that an operating torque corresponding to the pressure (bleed-off throttle opening area) is given. Further, the hydraulic fluid discharged from the swing hydraulic motor 27 encounters a resistance corresponding to the prevailing opening area of the meter-out throttle. A back pressure then arises to generate a braking torque corresponding to the opening area of the meter-out throttle. The same holds true when the swing spool 61 is at a position intermediate between the "B" and "C" positions.

When the control lever of the control lever device 72 is returned to the neutral position to return the swing spool 61 to the "B" position (neutral position), the swing hydraulic motor 27 attempts to continuously rotate due to its inertia because the swing structure 20 is an inertial body. If, in this instance, the pressure (back pressure) of the hydraulic fluid discharged from the swing hydraulic motor 27 is about to exceed the pressure setting of the swing variable overload relief valve 62a or 62b, the overload relief valve 62a or 62b actuates so that part of the hydraulic fluid is released to the tank. This restricts an increase in the back pressure and generates a braking torque corresponding to the pressure setting of the overload relief valve 62a or 62b.

Figure 6:
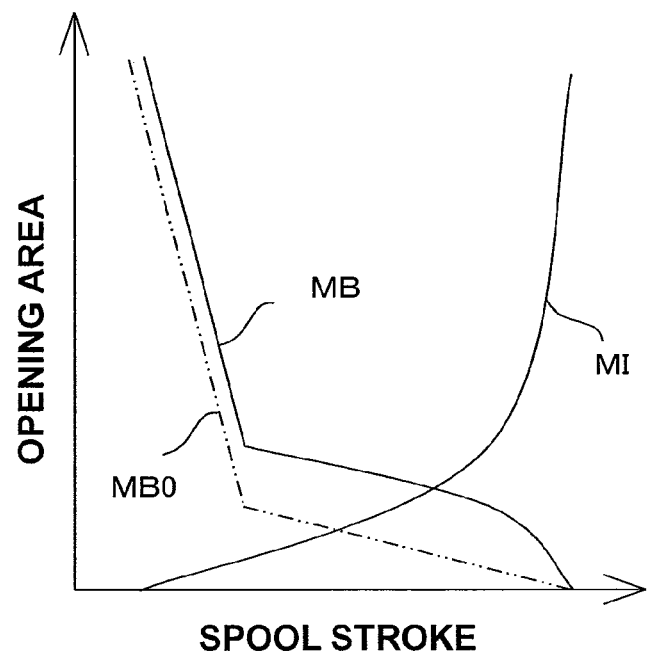
FIG. 6 is a characteristic diagram illustrating the meter-in opening area characteristics and bleed-off opening area characteristics of a swing spool included in an embodiment of the present invention of the hybrid construction machine and the auxiliary control device used therein.
Figure 7:
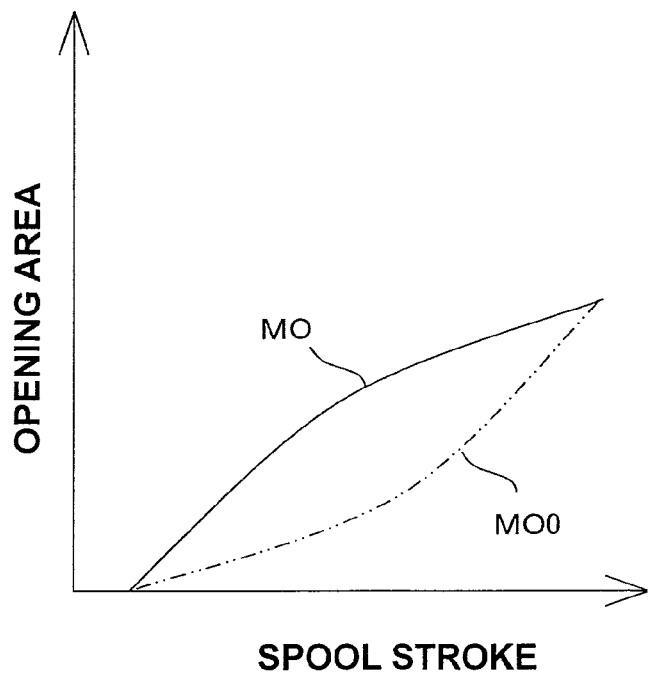
FIG. 7 is a characteristic diagram illustrating the meter-out opening area characteristics of the swing spool included in an embodiment of the present invention of the hybrid construction machine and the auxiliary control device used therein.

FIG. 6 is a characteristic diagram illustrating the meter-in opening area characteristics and bleed-off opening area characteristics of the swing spool 61 included in an embodiment of the present invention of the hybrid construction machine and the auxiliary control device used therein. FIG. 7 is a characteristic diagram illustrating the meter-out opening area characteristics of the swing spool 61 included in the embodiment of the present invention of the hybrid construction machine and the auxiliary control device used therein.

Referring to FIG. 6, a solid line MI represents the meter-in opening area characteristics according to the present embodiment, whereas a solid line MB represents the bleed-off opening area characteristics according to the present embodiment. A two-dot chain line MB0 represents bleed-off opening area characteristics that provide excellent operability of a conventional hydraulic excavator, which does not use an electric motor. The bleed-off opening area characteristics MB according to the present embodiment are identical with conventional bleed-off opening area characteristics at the beginning and end of a control region. In an intermediate region, however, the bleed-off opening area characteristics MB according to the present embodiment are designed to provide a larger opening area than the conventional bleed-off opening area characteristics.

Referring to FIG. 7, a solid line MO represents the meter-out opening area characteristics according to the present embodiment, whereas a two-dot chain line MOO represents the meter-out opening area characteristics that provide excellent operability of a conventional hydraulic excavator, which does not use an electric motor. The meter-out opening area characteristics MO according to the present embodiment are identical with conventional meter-out opening area characteristics at the beginning and end of a control region. In an intermediate region, however, the meter-out opening area characteristics MO according to the present embodiment are designed to provide a larger opening area than the conventional meter-out opening area characteristics.

Figure 8:
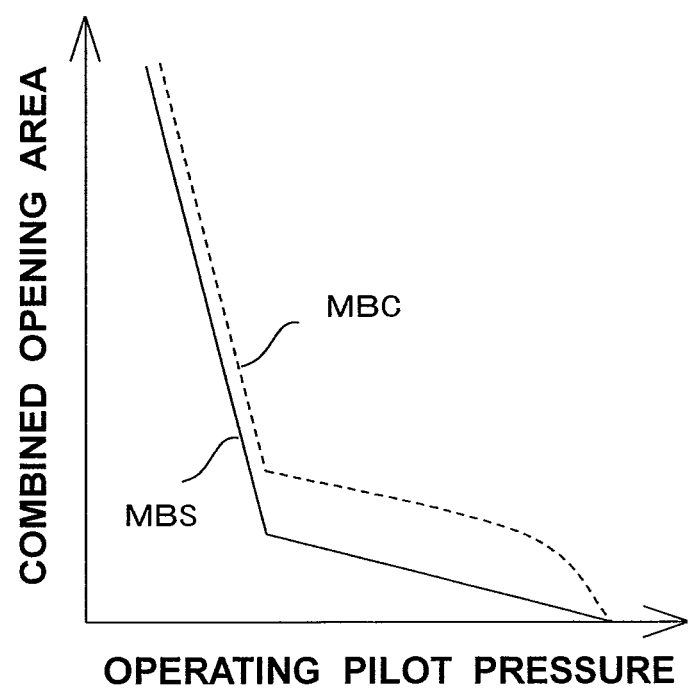
FIG. 8 is a characteristic diagram illustrating the combined opening area characteristics of the meter-in throttle and center bypass cut valve 63 of the swing spool 61 with respect to a hydraulic pilot signal (operating pilot pressure) in an embodiment of the present invention of the hybrid construction machine and the auxiliary control device used therein.

FIG. 8 is a characteristic diagram illustrating the combined opening area characteristics of the meter-in throttle of the swing spool 61 and center bypass cut valve 63 with respect to a hydraulic pilot signal (operating pilot pressure).

When the hydraulic/electric complex swing mode is selected, the swing drive characteristics correction command EE is not output. Therefore, the center bypass cut valve 63 is in an open position shown in the figure. Hence, the combined opening area characteristics of the meter-in throttle of the swing spool 61 and center bypass cut valve 63 are the characteristics of a broken line MBC, which are determined solely by the bleed-off opening area characteristics MB shown in FIG. 6 (first mode).

When the hydraulic-only swing mode is selected, the swing drive characteristics correction command EE is output to the electric-hydraulic conversion device 75c as mentioned earlier. The electric-hydraulic conversion device 75c then outputs the corresponding control pressure to the pressure-receiving section of the center bypass cut valve 63 so that the center bypass cut valve 63 switches into a throttle position, which is shown on the right side. When the center bypass cut valve 63 switches into the throttle position, the combined opening area characteristics of the meter-in throttle of the swing spool 61 and center bypass cut valve 63 with respect to the hydraulic pilot signal of the swing spool 61 are changed to the characteristics of a solid line MBS, which provides a smaller combined opening area than the characteristics of the broken line MBC (second mode). The combined opening area characteristics of the solid line MBS are equivalent to the bleed-off opening area characteristics that provide excellent operability of the conventional hydraulic excavator.

Figure 9:
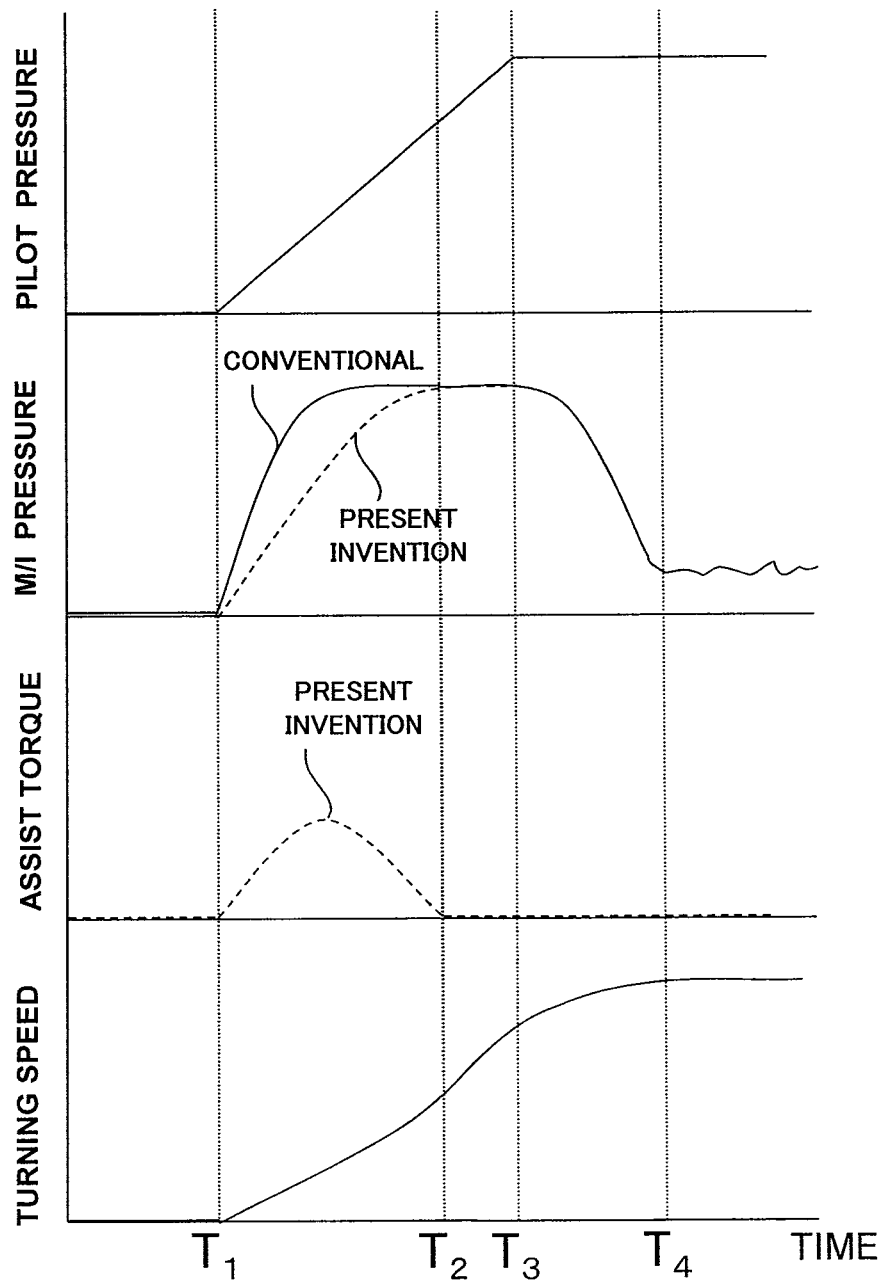
FIG. 9 is a characteristic diagram illustrating the time-series waveforms of a hydraulic pilot signal (pilot pressure), meter-in pressure (M/I pressure), swing electric motor assist torque, and swing structure rotation speed (turning speed) during a swing drive sequence in a hydraulic/electric complex swing mode in an embodiment of the present invention of the hybrid construction machine and the auxiliary control device used therein.

FIG. 9 is a characteristic diagram illustrating the time-series waveforms of the hydraulic pilot signal (pilot pressure), meter-in pressure (M/I pressure), swing electric motor 25 assist torque, and swing structure 20 rotation speed (turning speed) during a swing drive sequence in the hydraulic/electric complex swing mode. This figure shows an example in which the hydraulic pilot signal is increased in a ramp fashion over a certain period of time T (T1 to T4) from a swing stop state having a pilot pressure of 0 (zero) to the maximum pilot pressure.

When the hydraulic/electric complex swing mode is selected, the combined opening area characteristics of the meter-in throttle of the swing spool 61 and center bypass cut valve 63 are determined solely by the bleed-off opening area characteristics MB shown in FIG. 6 as indicated by the broken line MBC in FIG. 8. Therefore, the bleed-off throttle opening area in the present embodiment is larger than in a conventional case so that the meter-in pressure (M/I) in the present embodiment is lower than in the conventional case. As the meter-in pressure corresponds to the operating torque (acceleration torque) of the swing hydraulic motor 27, an acceleration torque corresponding to the amount of meter-in pressure decrease needs to be applied from the swing electric motor 25. FIG. 8 assumes that the assist torque on the power running side is positive. The present embodiment exercises control so that the sum of the assist torque of the swing electric motor 25 and the acceleration torque derived from the meter-in pressure generated by the swing spool 61 is substantially equal to the acceleration torque generated by the conventional hydraulic excavator. This ensures that the turning speed of the swing structure 20 can provide the same acceleration feeling as the conventional hydraulic excavator.

On the other hand, when the hydraulic-only swing mode is selected, the combined opening area characteristics of the meter-in throttle of the swing spool 61 and center bypass cut valve 63 are changed to the characteristics of the solid line MBS because they provide a smaller combined opening area than the broken line MBC in FIG. 8. Therefore, control is exercised so that the meter-in pressure generated by the swing spool 61 increases to the meter-in pressure indicated in FIG. 9 by a solid line representing the conventional hydraulic excavator, and that the acceleration torque derived from the meter-in pressure generated by the swing spool 61 is substantially equal to the acceleration torque generated by the conventional hydraulic excavator. This ensures that the turning speed of the swing structure 20 can provide the same acceleration feeling as the conventional hydraulic excavator.

Further, the fact that the swing hydraulic motor 27 can turn independently means that the maximum output torque of the swing hydraulic motor 27 is higher than the maximum output torque of the swing electric motor 25. Hence, even if the swing electric motor 25 performs an unintended motion in the hydraulic/electric complex swing mode, the motion does not create any significant hazard as far as a hydraulic circuit is normal. Thus, the present invention is also advantageous in terms of safety.

Figure 10:
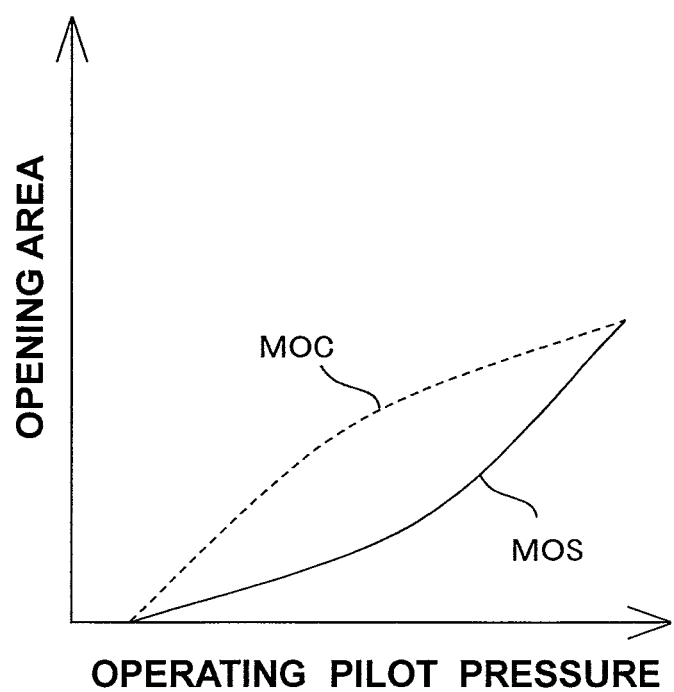
FIG. 10 is a characteristic diagram illustrating the meter-out opening area characteristics of the swing spool 61 with respect to the hydraulic pilot signal (operating pilot pressure) in an embodiment of the present invention of the hybrid construction machine and the auxiliary control device used therein.

FIG. 10 is a characteristic diagram illustrating the meter-out opening area characteristics of the swing spool 61 with respect to the hydraulic pilot signal (operating pilot pressure).

When the hydraulic/electric complex swing mode is selected, the swing pilot pressure correction command EF is not output. Therefore, the meter-out opening area characteristics of the swing spool 61 are the characteristics of a broken line MOC indicating the same changes as the meter-out opening area characteristics MO shown in FIG. 7 (first mode).

When the hydraulic-only swing mode is selected, the swing pilot pressure correction command EF is output to the electric-hydraulic conversion device 75d shown in FIG. 3 (electric-hydraulic conversion devices 75dL, 75dR shown in FIG. 4) as mentioned earlier. Thus, the electric-hydraulic conversion device 75d makes corrections by decreasing the hydraulic pilot signal (operating pilot pressure) generated by the control lever device 72. When the hydraulic pilot signal is corrected in the above manner, the meter-out opening area characteristics relative to the hydraulic pilot signal of the swing spool 61 are changed to the characteristics of a solid line MOS in which the opening area in the intermediate region is smaller than the characteristics of the broken line MOC in FIG. 10 (second mode). The opening area characteristics of the solid line MOS are equivalent to the meter-out opening area characteristics that provide excellent operability of the conventional hydraulic excavator.

Figure 11:
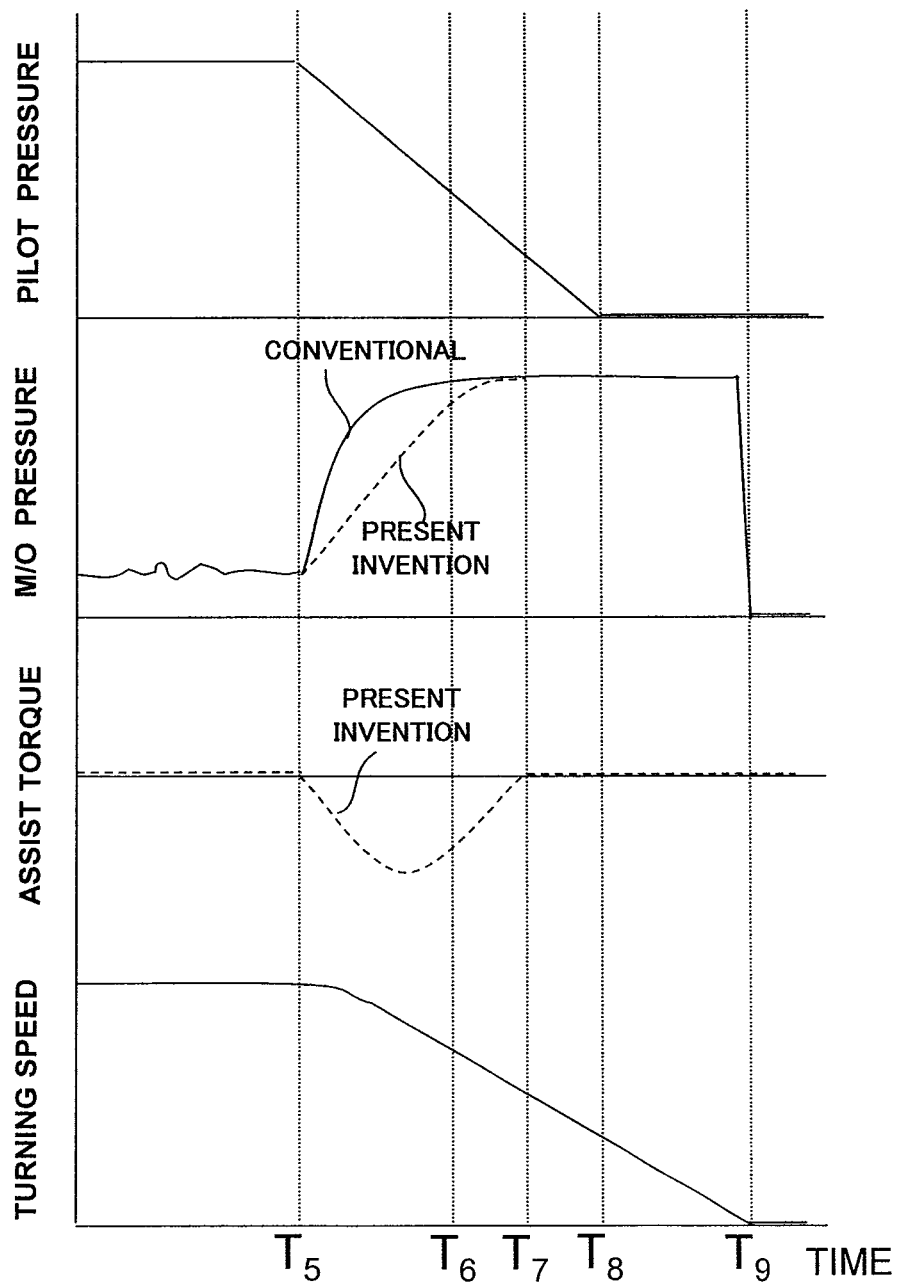
FIG. 11 is a characteristic diagram illustrating the time-series waveforms of the hydraulic pilot signal (pilot pressure), meter-out pressure (M/O pressure), swing electric motor assist torque, and upper swing structure rotation speed (turning speed) during a turning stop sequence in the hydraulic/electric complex swing mode in an embodiment of the present invention of the hybrid construction machine and the auxiliary control device used therein.

FIG. 11 is a characteristic diagram illustrating the time-series waveforms of the hydraulic pilot signal (pilot pressure), meter-out pressure (M/O pressure), swing electric motor 25 assist torque, and swing structure 20 rotation speed (turning speed) during a turning braking stop sequence in the hydraulic/electric complex swing mode. This figure shows an example in which the hydraulic pilot signal is decreased in a ramp fashion over a certain period of time T (T5 to T9) from the maximum pilot pressure at the maximum turning speed to a pilot pressure of 0 (zero).

When the hydraulic-only swing mode is selected, the meter-out opening area characteristics relative to the hydraulic pilot signal of the swing spool 61 change in the same manner as the meter-out opening area characteristics MO shown in FIG. 7 as indicated by the broken line MOC in FIG. 10. Hence, the meter-out throttle opening area in the present embodiment is larger than in a conventional case as indicated in FIG. 7 so that the meter-out pressure (M/O pressure) in the present embodiment is lower than in the conventional case. As the meter-out pressure corresponds to a brake torque (braking torque), a brake torque corresponding to the amount of meter-out pressure decrease needs to be applied from the electric motor 25. FIG. 11 assumes that the assist torque on the regeneration side is negative. The present embodiment exercises control so that the sum of the assist torque of the swing electric motor 25 and the brake torque derived from the meter-out pressure generated by the swing spool 61 is substantially equal to the brake torque generated by the conventional hydraulic excavator. This ensures that the turning speed of the swing structure 20 can provide the same deceleration feeling as the conventional hydraulic excavator.

On the other hand, when the hydraulic-only swing mode is selected, the meter-out opening area characteristics relative to the hydraulic pilot signal of the swing spool 61 are changed to the characteristics of the solid line MOS in which the opening area in the intermediate region is smaller than the characteristics of the broken line MOC in FIG. 11. Therefore, control is exercised so that the meter-out pressure generated by the swing spool 61 increases to the meter-out pressure indicated in FIG. 11 by a solid line representing the conventional hydraulic excavator, and that the brake torque derived from the meter-out pressure generated by the swing spool 61 is substantially equal to the brake torque generated by the conventional hydraulic excavator. This ensures that the turning speed of the swing structure 20 can provide the same deceleration feeling as the conventional hydraulic excavator.

Figure 12:
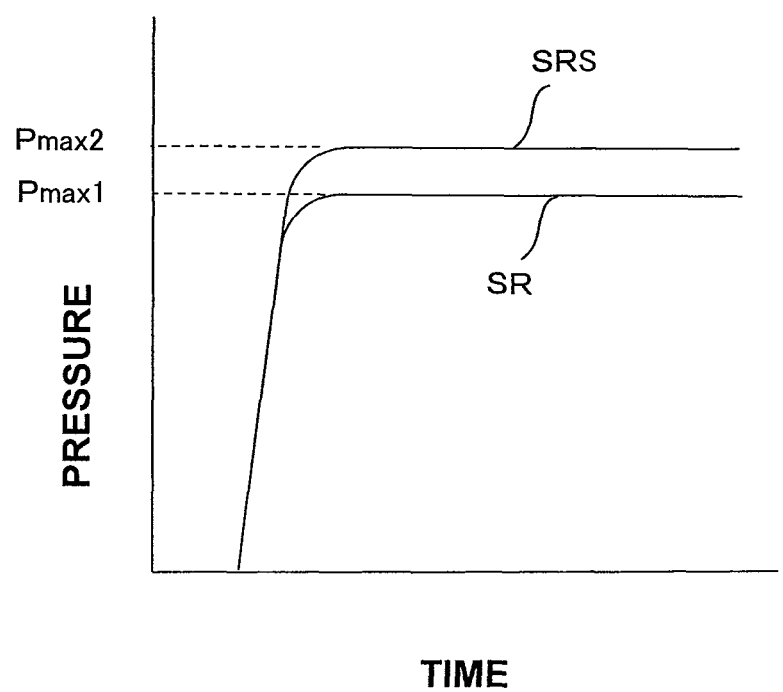
FIG. 12 is a characteristic diagram illustrating the relief pressure characteristics of swing variable overload relief valves included in an embodiment of the present invention of the hybrid construction machine and the auxiliary control device used therein.

FIG. 12 is a diagram illustrating the relief pressure characteristics of the swing variable overload relief valves 62a, 62b.

When the hydraulic/electric complex swing mode is selected and the torque reduction command EC is output to the electric-hydraulic conversion device 75b shown in FIG. 3 (electric-hydraulic conversion devices 75bL, 75bR shown in FIG. 4), the electric-hydraulic conversion device 75b generates the control pressure. The control pressure is then exerted on the pressure setting decrease side of the variable overload relief valves 62a, 62b. Consequently, the relief characteristics of the variable overload relief valves 62a, 62b are the characteristics of a solid line SR representing a relief pressure of Pmax1 (first mode). When, on the other hand, the hydraulic-only swing mode is selected and the torque reduction command EC is not output to the electric-hydraulic conversion device 75b (electric-hydraulic conversion devices 75bL, 75bR shown in FIG. 4), the electric-hydraulic conversion device 75b does not generate the control pressure. Therefore, the relief characteristics of the variable overload relief valves 62a, 62b are the characteristics of a solid line SRS representing a relief pressure of Pmax2, which is higher than Pmax1 (second mode). As a result, the braking torque increases by the amount of the relief pressure increase.

As such being the case, when the hydraulic/electric complex swing mode is selected, the relief pressure of the variable overload relief valves 62a, 62b is set to Pmax1, which is lower than Pmax2. Hence, control is exercised so that when the control lever of the control lever device 72 is returned to the neutral position, the pressure (back pressure) of the hydraulic fluid discharged from the swing hydraulic motor 27 rises to Pmax1, which is a relatively low pressure setting for the variable overload relief valves 62a, 62b, and that the sum of the assist torque of the swing electric motor 25 and the brake torque derived from the back pressure generated by the variable overload relief valve 62a or 62b is substantially equal to the brake torque generated by the conventional hydraulic excavator. This ensures that the turning speed of the swing structure 20 can provide the same deceleration feeling as the conventional hydraulic excavator.

When, on the other hand, the hydraulic-only swing mode is selected, the relief pressure of the variable overload relief valves 62a, 62b is set to Pmax2, which is higher than Pmax1. Therefore, control is exercised so that when the control lever of the control lever device 72 is returned to the neutral position, the pressure (back pressure) of the hydraulic fluid discharged from the swing hydraulic motor 27 rises to Pmax2, which is a relatively high pressure setting for the variable overload relief valves 62a, 62b, and that the brake torque derived from the back pressure generated by the variable overload relief valve 62a or 62b is substantially equal to the brake torque generated by the conventional hydraulic excavator. This ensures that the turning speed of the swing structure 20 can provide the same deceleration feeling as the conventional hydraulic excavator.

Figure 13:
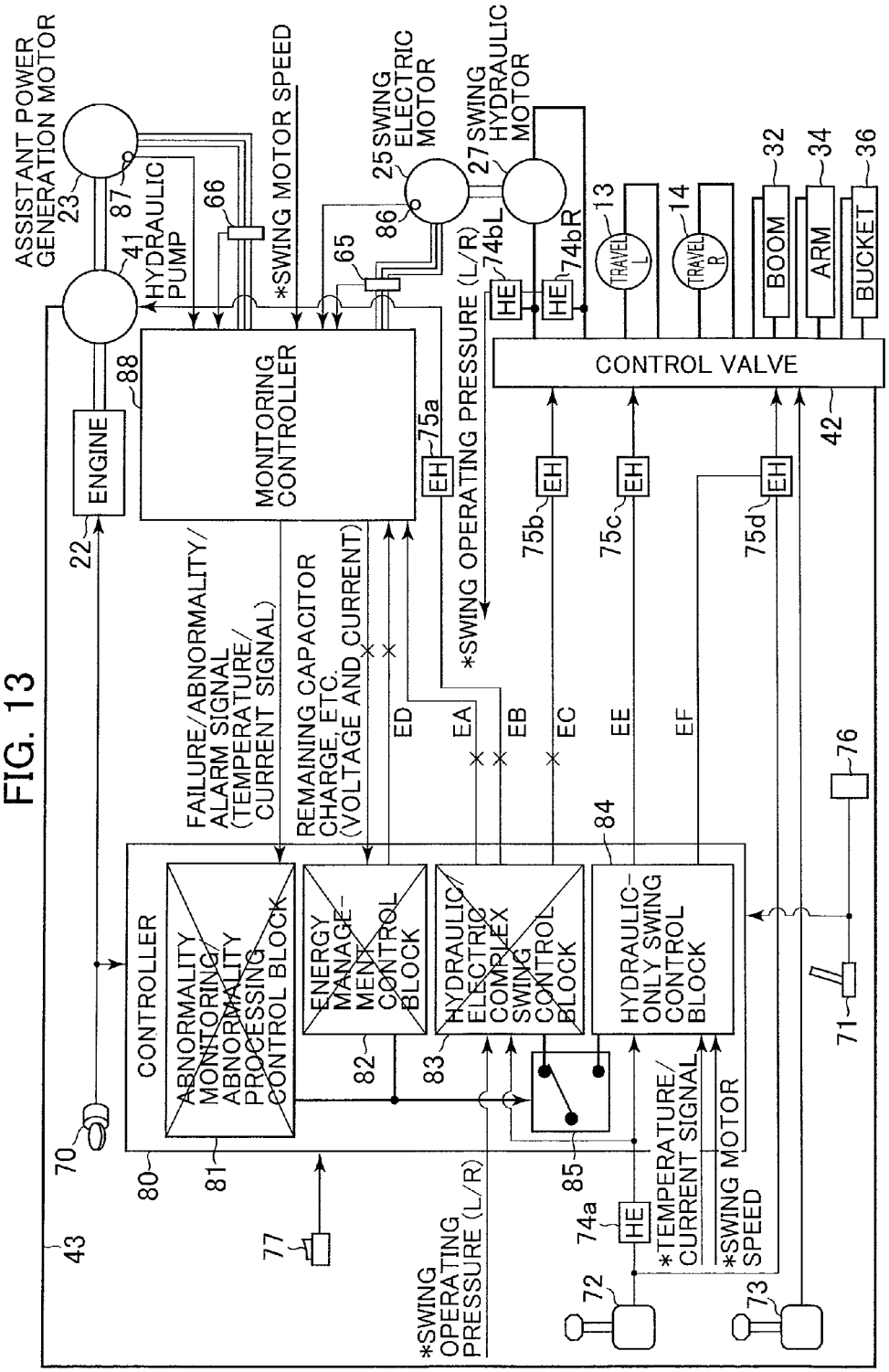
FIG. 13 is a system configuration/control block diagram illustrating a state where a monitoring controller is used to replace a power control unit included in an embodiment of the present invention of the hybrid construction machine and the auxiliary control device used therein.
Figure 14:
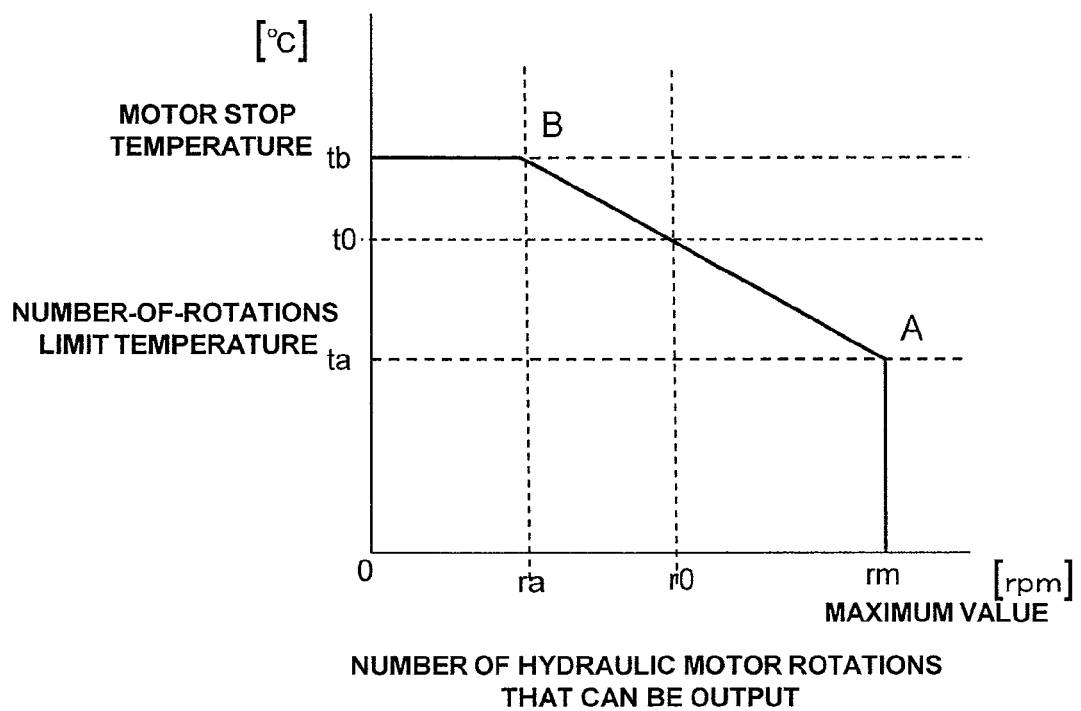
FIG. 14 is a characteristic diagram illustrating the relationship between the rotation speed and limit temperature of a hydraulic motor applied to the monitoring controller shown in FIG. 13.

A system obtained after the power control unit included in an embodiment of the present invention of the hybrid construction machine is replaced by a monitoring controller will now be described with reference to FIGS. 13 and 14. FIG. 13 is a system configuration/control block diagram illustrating a state where the monitoring controller is used to replace the power control unit included in an embodiment of the present invention of the hybrid construction machine and the auxiliary control device used therein. FIG. 14 is a characteristic diagram illustrating the relationship between the rotation speed and limit temperature of a hydraulic motor applied to the monitoring controller shown in FIG. 13. Elements shown in FIGS. 13 and 14 and designated by the same reference numerals as those in FIGS. 1 to 12 are identical with their counterpart elements in FIGS. 1 to 12 and will not be described in detail.

Measures to be taken when the power control unit or capacitor in the above-described hybrid hydraulic excavator needs to be repaired due to its fault will now be discussed. It is highly probable that these units may become faulty after a long period of use because they contain electric or electronic parts. When such parts are faulty, it is common that they are entirely replaced.

Meanwhile, it is conceivable that hydraulic excavators may be used for a long period of time, such as for a period of longer than 20 years, not only in advanced countries but also in developing countries or in an inhospitable environment. Even in such a situation, it is preferred that the hydraulic excavators be continuously usable no matter whether the above-mentioned parts become faulty after the expiry of a manufacturer's service support period. However, it is extremely difficult for manufacturers to continuously supply specific electric or electronic parts for many years. It is also extremely difficult for users to manage and store such specific parts for many years.

In view of the above circumstances, the present embodiment is configured as shown in FIG. 13 so that the power control unit 55 and the like can be removed to install the monitoring controller 88 (auxiliary control device). The monitoring controller 88 is a simple substitute controller that merely detects the temperature and electrical leakage in the swing electric motor 25 and in the assist power generation motor 23. In this instance, it is not possible to provide drive control of the motors 25, 23. Therefore, the upper-level controller 80 merely provides hydraulic-only swing control so that the hydraulic excavator can be operated without using the driving force of the swing electric motor 25.

In the above instance, the rotor of the assist power generation motor 23 is forcibly rotated by the engine 22, whereas the rotor of the swing electric motor 25 is forcibly rotated by the swing hydraulic motor 27. When the motors 25, 23 are permanent-magnet synchronous motors, an induced voltage is generated in an electric motor terminal section due to power generation. If the electric operating system becomes faulty for some reason in a situation where the construction machine is operated under the above conditions, the induced voltage may be short-circuited by a faulty part so that an accidental short-circuit current flows to overheat a part of the electric operating system. In order to avoid the above-mentioned risk, the monitoring controller 88 (auxiliary control device) merely monitors the temperature and electrical leakage, and issues an alarm to the upper-level controller 80 in the event of temperature abnormality or electrical leakage.

As shown in FIG. 13, the power control unit 55, the main contactor 56, the capacitor 24, and the like are removed to install the monitoring controller 88 as a substitute controller. The monitoring controller 88 is electrically connected to the controller 80 so that an abnormality notification signal can be exchanged.

A current sensor 65 is attached to a cable laid between the power control unit 55 and the swing electric motor 25 to detect a current I1 flowing in the cable. A current sensor 66 is attached to a cable laid between the power control unit 55 and the assist power generation motor 23 to detect a current I2 flowing in the cable. These current sensors 65, 66 detect an overcurrent flowing in the event of electrical leakage and are electrically connected to the monitoring controller 88.

A temperature sensor 86 is disposed in the swing electric motor 25 to detect its internal temperature t1. A temperature sensor 87 is disposed in the assist power generation motor 23 to detect its internal temperature t2. These temperature sensors 86, 87 are electrically connected to the monitoring controller 88.

Further, a resolver or other similar device for detecting the number of rotations of the swing electric motor 25 is electrically connected to the monitoring controller 88.

The monitoring controller 88 includes an input section, a memory section, a computation section, and an output section. The input section receives detection signals from the current sensors 65, 66, temperature sensors 86, 87, and the resolver or the like and converts them to arithmetic values. The memory section stores predefined settings. The computation section performs computations in accordance with the arithmetic values derived from the input section and with the settings stored in the memory section. The output section outputs determination results produced in the computation section to the controller 80.

First of all, an operation performed by the monitoring controller 88 according to a temperature signal will be described. In the first step, the monitoring controller 88 reads temperature signals t1, t2 and a number-of-rotations signal r of the swing hydraulic motor 27. More specifically, the monitoring controller 88 reads the internal temperature signal t1 of the swing electric motor 25 and the internal temperature signal t2 of the assist power generation motor 23, which are detected by the temperature sensors 86, 87, and the number of rotations r of the swing electric motor 27, which is detected, for instance, by the resolver.

In the second step, a check is performed to determine whether the temperature signals read in the first step are high. More specifically, the limit value characteristics of the temperature signals t1, t2 relative to the number of rotations r of the swing hydraulic motor 27, which are predefined and memorized, are compared to the detected signals read in the first step. FIG. 14 shows an example of the limit value characteristics of the temperature signals t1, t2 relative to the number of rotations r of the swing hydraulic motor 27. Referring to FIG. 14, to denotes a limit temperature for the maximum number of rotations rm of the swing hydraulic motor 27, tb denotes a temperature at which the swing hydraulic motor 27 needs to stop, and ra denotes the maximum permissible number of rotations at the temperature at which the swing hydraulic motor 27 needs to stop.

Referring to FIG. 14, if, for instance, the temperature signals t1, t2 are found in the second step to be lower than $t_0$ of the limit value characteristics in a situation where the number of rotations of the swing hydraulic motor 27 is $r_0$, it is determined that no abnormality exists. If, on the other hand, the temperature signals t1, t2 are found in the second step to be higher than $t_0$ of the limit value characteristics in the same situation, it is determined that an abnormality exists.

If the determination result obtained in the second step indicates that an abnormality exists, processing proceeds to the third step. In the third step, an abnormality signal is transmitted to the controller 80. As a result, the controller 80 may, for example, cause a monitor or the like to display a message indicating that the temperature at which the swing hydraulic motor 27 needs to stop is exceeded by the temperature signals t1, t2 or send a relevant voice message to an operator.

An operation performed by the monitoring controller 88 according to an electrical current signal will now be described. In the first step, the monitoring controller 88 reads the current signals I1, I2 and the number-of-rotations signal r of the swing hydraulic motor 27. More specifically, the monitoring controller 88 reads the current signal I1 of the swing electric motor 25 and the current signal I2 of the assist power generation motor 23, which are detected by the current sensors 65, 66.

In the second step, a check is performed to determine whether the current signals read in the first step are high. More specifically, a current setting It at which the swing hydraulic motor 27 needs to stop is compared to each detected signal read in the first step.

If the determination result obtained in the second step indicates that an abnormality exists, processing proceeds to the third step. In the third step, an abnormality signal is transmitted to the controller 80. As a result, the controller 80 may, for example, cause a monitor or the like to display a message indicating that a current value at which the swing hydraulic motor 27 needs to stop is exceeded by the current signals I1, I2 or send a relevant voice message to the operator.

According to the above-described embodiment of the present invention, even when the torque of the swing electric motor 25 cannot be generated due to a failure in the swing electric motor 25, inverter 55, electrical storage device 24, or other electric operating system component included in the hybrid construction machine that uses the swing hydraulic motor 27 and the swing electric motor 25 to drive the swing structure 20, the hybrid construction machine can be operated by driving the swing structure 20 with the swing hydraulic motor 27 alone. Further, even when the electric operating system is irreparable due to deterioration, uninterrupted machine operations can be performed by incorporating the auxiliary control device into the electric operating system as a substitute, monitoring the temperature or electrical leakage in the swing electric motor 25, and driving the swing structure with the swing hydraulic motor 27 alone.

The present embodiment has been described on the assumption that the monitoring controller 88 has the limit value characteristics of the temperature signals t1, t2 relative to the number of rotations r of the swing hydraulic motor 27. However, the present invention is not limited to the use of such an abnormality detection method. An alternative is to detect an abnormality by merely comparing a detected temperature to a preselected temperature.

Further, although the embodiments have been described on the assumption that the present invention is applied to a hydraulic excavator, the present invention is also applicable to various other construction machines having a swing structure.

Description of Reference Numerals

10 . . . Track structure
11 . . . Crawler
12 . . . Crawler frame
13 . . . Right travel hydraulic motor
14 . . . Left travel hydraulic motor
20 . . . Swing structure
21 . . . Swing frame
22 . . . Engine
23 . . . Assist power generation motor
24 . . . Capacitor
25 . . . Swing electric motor
26 . . . Speed reduction mechanism
27 . . . Swing hydraulic motor
30 . . . Excavator mechanism
31 . . . Boom
33 . . . Arm
35 . . . Bucket
40 . . . Hydraulic system
41 . . . Hydraulic pump
42 . . . Control valve
51 . . . Chopper
52 . . . Inverter for swing electric motor
53 . . . Inverter for assist power generation motor
54 . . . Smoothing capacitor
55 . . . Power control unit
56 . . . Main contactor
57 . . . Main relay
58 . . . Inrush current prevention circuit
65 . . . Current sensor
66 . . . Current sensor
80 . . . Controller
81 . . . Abnormality monitoring/abnormality processing control Block
82 . . . Energy management control block
83 . . . Hydraulic/electric complex swing control block
84 . . . Hydraulic-only swing control block
85 . . . Control changeover block
86 . . . Temperature sensor
87 . . . Temperature sensor
88 . . . Monitoring controller (auxiliary control device)

The invention claimed is:

1. A hybrid construction machine having a prime mover, a hydraulic pump driven by the prime mover, a swing structure, an electric motor for driving the swing structure, a power control unit for driving the electric motor, a hydraulic motor driven by the hydraulic pump to drive the swing structure, an electrical storage device connected to the electric motor, and a swing control lever device for issuing a command for driving the swing structure, the hybrid construction machine comprising:

a control device that switches between a hydraulic/electric complex swing mode and a hydraulic-only swing mode, the hydraulic/electric complex swing mode being selected so that when the swing control lever device is manipulated, both the electric motor and the hydraulic motor are driven to drive the swing structure by using the sum of the torque of the electric motor and the torque of the hydraulic motor, the hydraulic-only swing mode being selected so that when the swing control lever device is manipulated, only the hydraulic motor is driven to drive the swing structure by using only the torque of the hydraulic motor; and an auxiliary control device having a monitoring controller that is connected to the control device and to the electric motor to monitor the temperature or electrical leakage in the electric motor as a substitute controller for the power control unit or the electrical storage device when the power control unit the electrical storage device is removed due to a fault.

2. The hybrid construction machine according to claim 1, wherein the auxiliary control device includes a monitoring controller having a temperature sensor for detecting the internal temperature of the electric motor, a memory section for memorizing a preselected limit value, and a computation section for reporting an abnormality to the control device when the preselected limit value is exceeded by a value detected by the temperature sensor.

3. The hybrid construction machine according to claim 1, wherein the auxiliary control device includes a monitoring controller having a current sensor for detecting the output current of the electric motor, a memory section for memorizing a preselected limit value, and a computation section for reporting an abnormality to the control device when the preselected limit value is exceeded by a value detected by the current sensor.

4. An auxiliary control device for a hybrid construction machine having a prime mover, a hydraulic pump driven by the prime mover, a swing structure, an electric motor for driving the swing structure, a power control unit for driving the electric motor, a hydraulic motor driven by the hydraulic pump to drive the swing structure, an electrical storage device connected to the electric motor, a swing control lever device for issuing a command for driving the swing structure, and a control device for switching between a hydraulic/electric complex swing mode and a hydraulic-only swing mode, the hydraulic/electric complex swing mode being selected so that when the swing control lever device is manipulated, both the electric motor and the hydraulic motor are driven to drive the swing structure by using the sum of the torque of the electric motor and the torque of the hydraulic motor, the hydraulic-only swing mode being selected so that when the swing control lever device is manipulated, only the hydraulic motor is driven to drive the swing structure by using only the torque of the hydraulic motor, the auxiliary control device comprising:

a monitoring controller that is connected to the control device to monitor the temperature or electrical leakage in the electric motor as a substitute for the power control unit or the electrical storage device when the power control unit or the electrical storage device is removed due to a fault.

5. The auxiliary control device according to claim 4, wherein the monitoring controller includes a temperature sensor for detecting the internal temperature of the electric motor, a memory section for memorizing a preselected limit value, and a computation section for reporting an abnormality to the control device when the preselected limit value is exceeded by a value detected by the temperature sensor.

6. The auxiliary control device according to claim 4, wherein the monitoring controller includes a current sensor for detecting the output current of the electric motor, a memory section for memorizing a preselected limit value, and a computation section for reporting an abnormality to the control device when the preselected limit value is exceeded by a value detected by the current sensor.

* * * * *